(12) United States Patent
Candelore

(10) Patent No.: US 9,483,997 B2
(45) Date of Patent: Nov. 1, 2016

(54) PROXIMITY DETECTION OF CANDIDATE COMPANION DISPLAY DEVICE IN SAME ROOM AS PRIMARY DISPLAY USING INFRARED SIGNALING

(71) Applicant: Sony Corporation, Tokyo (JP)

(72) Inventor: Brant Candelore, San Diego, CA (US)

(73) Assignee: Sony Corporation, Tokyo (JP)

( * ) Notice: Subject to any disclaimer, the term of this patent is extended or adjusted under 35 U.S.C. 154(b) by 314 days.

(21) Appl. No.: 14/202,309

(22) Filed: Mar. 10, 2014

(65) Prior Publication Data

US 2015/0255037 A1   Sep. 10, 2015

(51) Int. Cl.
| | |
|---|---|
| G09G 5/00 | (2006.01) |
| G06F 3/14 | (2006.01) |
| H04W 4/02 | (2009.01) |
| H04N 21/41 | (2011.01) |
| H04N 21/436 | (2011.01) |
| G01S 5/02 | (2010.01) |
| G01S 5/16 | (2006.01) |
| H04W 4/00 | (2009.01) |
| H04W 4/04 | (2009.01) |

(52) U.S. Cl.
CPC ............. *G09G 5/006* (2013.01); *G01S 5/0284* (2013.01); *G01S 5/16* (2013.01); *G06F 3/1454* (2013.01); *H04N 21/4126* (2013.01); *H04N 21/43615* (2013.01); *H04W 4/008* (2013.01); *H04W 4/023* (2013.01); *H04W 4/043* (2013.01)

(58) Field of Classification Search
None
See application file for complete search history.

(56) References Cited

U.S. PATENT DOCUMENTS

| | | |
|---|---|---|
| 6,008,777 A | 12/1999 | Yiu |
| 6,100,925 A | 8/2000 | Rosser et al. |
| 6,111,517 A | 8/2000 | Atick et al. |
| 6,301,370 B1 | 10/2001 | Steffens et al. |
| 6,643,650 B1 | 11/2003 | Slaughter et al. |
| 6,789,077 B1 | 9/2004 | Slaughter et al. |
| 6,789,126 B1 | 9/2004 | Saulpaugh et al. |
| 6,792,466 B1 | 9/2004 | Saulpaugh et al. |
| 6,850,979 B1 | 2/2005 | Saulpaugh et al. |
| 6,862,594 B1 | 3/2005 | Saulpaugh et al. |
| 6,868,447 B1 | 3/2005 | Slaughter et al. |

(Continued)

FOREIGN PATENT DOCUMENTS

| | | |
|---|---|---|
| JP | 2005192098 A | 7/2005 |
| JP | 2010200275 A | 2/2009 |

(Continued)

OTHER PUBLICATIONS

Brant Candelore, "Proximity Detection of Candidate Companion Display Device in Same Room as Primary Display Using Infared Signaling", related U.S. Appl. No. 14/262,051, Final Office Action dated Sep. 25, 2015.

(Continued)

*Primary Examiner* — Nicholas Lee

(74) *Attorney, Agent, or Firm* — John L. Rogitz

(57) ABSTRACT

A candidate companion screen device is located by a primary display device as being in the same room as the primary device using IRDA, and in response ancillary content related to content being shown on the primary display device is provided to the companion screen device. The ancillary content may be provided from the Internet based on information in the content being presented on the primary display device by, e.g., providing a link to a website to the companion device.

23 Claims, 3 Drawing Sheets

(56) References Cited

U.S. PATENT DOCUMENTS

| | | |
|---|---|---|
| 6,898,618 B1 | 5/2005 | Slaughter et al. |
| 6,910,068 B2 | 6/2005 | Zintel et al. |
| 6,917,976 B1 | 7/2005 | Slaughter et al. |
| 6,918,084 B1 | 7/2005 | Slaughter et al. |
| 6,950,875 B1 | 9/2005 | Slaughter et al. |
| 6,970,869 B1 | 11/2005 | Slaughter et al. |
| 6,973,493 B1 | 12/2005 | Slaughter et al. |
| 7,010,573 B1 | 3/2006 | Saulpaugh et al. |
| 7,016,966 B1 | 3/2006 | Saulpaugh et al. |
| 7,065,574 B1 | 6/2006 | Saulpaugh et al. |
| 7,072,967 B1 | 7/2006 | Saulpaugh et al. |
| 7,080,078 B1 | 7/2006 | Slaughter et al. |
| 7,188,251 B1 | 3/2007 | Slaughter et al. |
| 7,200,848 B1 | 4/2007 | Slaughter et al. |
| 7,243,356 B1 | 7/2007 | Saulpaugh et al. |
| 7,260,543 B1 | 8/2007 | Saulpaugh et al. |
| 7,370,091 B1 | 5/2008 | Slaughter et al. |
| 7,395,333 B1 | 7/2008 | Saulpaugh et al. |
| 7,398,533 B1 | 7/2008 | Slaughter et al. |
| 7,412,518 B1 | 8/2008 | Duigou et al. |
| 7,426,721 B1 | 9/2008 | Saulpaugh et al. |
| 7,437,434 B2 | 10/2008 | Zintel et al. |
| 7,441,019 B2 | 10/2008 | Zintel et al. |
| 7,444,644 B1 | 10/2008 | Slaughter et al. |
| 7,458,082 B1 | 11/2008 | Slaughter et al. |
| 7,499,574 B1 | 3/2009 | Yang et al. |
| 7,548,946 B1 | 6/2009 | Saulpaugh et al. |
| 7,577,834 B1 | 8/2009 | Traversat et al. |
| 7,680,041 B2 | 3/2010 | Johansen |
| 7,689,613 B2 | 3/2010 | Candelore |
| 7,693,895 B2 | 4/2010 | Takayama et al. |
| 7,716,385 B2 | 5/2010 | Saint-Hilaire et al. |
| 7,716,492 B1 | 5/2010 | Saulpaugh et al. |
| 7,725,912 B2 | 5/2010 | Margulis |
| 7,796,190 B2 | 9/2010 | Basso et al. |
| 7,991,873 B2 | 8/2011 | Kato et al. |
| 8,001,232 B1 | 8/2011 | Saulpaugh et al. |
| 8,019,883 B1 | 9/2011 | Margulis |
| 8,068,095 B2 | 11/2011 | Pryor |
| 8,078,230 B2 | 12/2011 | Schuler et al. |
| 8,079,055 B2 | 12/2011 | Hardacker et al. |
| 8,082,491 B1 | 12/2011 | Abdelaziz et al. |
| 8,112,513 B2 | 2/2012 | Margulis |
| 8,135,796 B1 | 3/2012 | Slaughter et al. |
| 8,184,141 B2 | 5/2012 | Caspi et al. |
| 8,200,796 B1 | 6/2012 | Margulis |
| 8,208,729 B2 | 6/2012 | Foss et al. |
| 8,218,821 B2 | 7/2012 | Sefton et al. |
| 8,219,720 B2 | 7/2012 | Saint-Hilaire et al. |
| 8,220,020 B2 | 7/2012 | Deshpande |
| 8,233,675 B2 | 7/2012 | Reed et al. |
| 8,285,006 B2 | 10/2012 | Tang |
| 8,296,808 B2 | 10/2012 | Hardacker et al. |
| 8,320,674 B2 | 11/2012 | Guillou et al. |
| 8,347,319 B2 | 1/2013 | Greeff et al. |
| 8,356,251 B2 | 1/2013 | Strober |
| 8,365,223 B2 | 1/2013 | Watanabe et al. |
| 8,392,597 B2 | 3/2013 | Kim et al. |
| 8,397,264 B2 | 3/2013 | Ansari et al. |
| 8,413,223 B2 | 4/2013 | Akiyama et al. |
| 8,438,589 B2 | 5/2013 | Candelore |
| 8,494,231 B2 | 7/2013 | Folta et al. |
| 8,561,069 B2 | 10/2013 | Masuoka et al. |
| 8,571,598 B2 | 10/2013 | Valavi |
| 8,588,131 B2 | 11/2013 | Sato et al. |
| 8,614,668 B2 | 12/2013 | Pryor |
| 8,620,949 B2 | 12/2013 | Son et al. |
| 8,621,498 B2 | 12/2013 | Candelore |
| 8,629,942 B2 | 1/2014 | Candelore |
| 8,643,703 B1 | 2/2014 | Karakotsios et al. |
| 8,649,652 B2 | 2/2014 | Kageyama et al. |
| 9,100,688 B2 | 8/2015 | Shigeta et al. |
| 9,344,632 B2 | 5/2016 | Arai et al. |
| 2001/0037499 A1 | 11/2001 | Turock et al. |
| 2002/0029256 A1 | 3/2002 | Zintel et al. |
| 2002/0054206 A1 | 5/2002 | Allen |
| 2002/0078161 A1 | 6/2002 | Cheng |
| 2002/0083143 A1 | 6/2002 | Cheng |
| 2002/0122137 A1 | 9/2002 | Chen et al. |
| 2003/0009771 A1 | 1/2003 | Chang |
| 2003/0046685 A1 | 3/2003 | Srinivasan et al. |
| 2003/0107677 A1 | 6/2003 | Lu et al. |
| 2003/0210337 A1 | 11/2003 | Hall |
| 2004/0003073 A1 | 1/2004 | Krzyzanowski et al. |
| 2004/0068752 A1 | 4/2004 | Parker |
| 2004/0230636 A1 | 11/2004 | Masuoka et al. |
| 2005/0024324 A1 | 2/2005 | Tomasi et al. |
| 2005/0074018 A1 | 4/2005 | Zintel et al. |
| 2005/0097503 A1 | 5/2005 | Zintel et al. |
| 2005/0125820 A1 | 6/2005 | Nelson et al. |
| 2005/0134578 A1 | 6/2005 | Chambers et al. |
| 2006/0064720 A1 | 3/2006 | Islvan et al. |
| 2006/0095941 A1* | 5/2006 | Fidler ............... H04L 29/06027 725/81 |
| 2006/0184851 A1 | 8/2006 | Froidcoeur et al. |
| 2006/0195866 A1 | 8/2006 | Thukral |
| 2006/0218602 A1 | 9/2006 | Sherer et al. |
| 2007/0192813 A1 | 8/2007 | Kim |
| 2007/0200916 A1 | 8/2007 | Han |
| 2007/0230786 A1 | 10/2007 | Foss et al. |
| 2007/0280534 A1 | 12/2007 | Foss et al. |
| 2008/0013801 A1 | 1/2008 | Reed et al. |
| 2008/0016467 A1 | 1/2008 | Chambers et al. |
| 2008/0112405 A1 | 5/2008 | Cholas et al. |
| 2008/0146265 A1 | 6/2008 | Valavi |
| 2008/0175479 A1 | 7/2008 | Sefton et al. |
| 2008/0204273 A1 | 8/2008 | Crystal et al. |
| 2008/0259222 A1 | 10/2008 | Hardacker et al. |
| 2008/0279425 A1 | 11/2008 | Tang |
| 2008/0279453 A1 | 11/2008 | Candelore |
| 2008/0313670 A1 | 12/2008 | Ho et al. |
| 2009/0037951 A1 | 2/2009 | Candelore et al. |
| 2009/0041310 A1 | 2/2009 | Yang et al. |
| 2009/0041418 A1 | 2/2009 | Candelore et al. |
| 2009/0057868 A1 | 3/2009 | Wang et al. |
| 2009/0150569 A1 | 6/2009 | Kumar et al. |
| 2009/0161600 A1 | 6/2009 | Sato et al. |
| 2009/0172744 A1 | 7/2009 | Rothschild |
| 2009/0195638 A1 | 8/2009 | Caspi et al. |
| 2009/0313675 A1 | 12/2009 | Howarter et al. |
| 2009/0327892 A1 | 12/2009 | Douillet et al. |
| 2010/0042925 A1 | 2/2010 | DeMartin et al. |
| 2010/0050006 A1 | 2/2010 | Nishibayashi et al. |
| 2010/0093286 A1 | 4/2010 | Noda et al. |
| 2010/0125884 A1 | 5/2010 | Howcroft |
| 2010/0231790 A1 | 9/2010 | Ansari et al. |
| 2010/0315549 A1 | 12/2010 | Basso et al. |
| 2011/0041174 A1 | 2/2011 | Akiyama et al. |
| 2011/0047239 A1 | 2/2011 | Choi et al. |
| 2011/0072464 A1 | 3/2011 | Watanabe et al. |
| 2011/0103773 A1 | 5/2011 | Johnson et al. |
| 2011/0109751 A1 | 5/2011 | Chang et al. |
| 2011/0115698 A1 | 5/2011 | Chung et al. |
| 2011/0115818 A1 | 5/2011 | Chung et al. |
| 2011/0116419 A1 | 5/2011 | Cholas et al. |
| 2011/0119393 A1 | 5/2011 | Kim et al. |
| 2011/0128378 A1 | 6/2011 | Raji |
| 2011/0157467 A1 | 6/2011 | McRae |
| 2011/0216753 A1 | 9/2011 | Kneckt et al. |
| 2011/0246291 A1 | 10/2011 | Paul |
| 2011/0289460 A1 | 11/2011 | Dow et al. |
| 2012/0011550 A1 | 1/2012 | Holland |
| 2012/0069131 A1 | 3/2012 | Abelow |
| 2012/0077586 A1 | 3/2012 | Pishevar |
| 2012/0079080 A1 | 3/2012 | Pishevar |
| 2012/0079368 A1 | 3/2012 | Abdelaziz et al. |
| 2012/0089923 A1 | 4/2012 | Pettit et al. |
| 2012/0095779 A1 | 4/2012 | Wengrovitz et al. |
| 2012/0106806 A1 | 5/2012 | Folta et al. |
| 2012/0143902 A1 | 6/2012 | Son et al. |
| 2012/0158972 A1 | 6/2012 | Gammill et al. |
| 2012/0159531 A1 | 6/2012 | O'Callaghan |
| 2012/0173755 A1 | 7/2012 | Margulis |
| 2012/0174155 A1 | 7/2012 | Mowrey et al. |

(56) References Cited

U.S. PATENT DOCUMENTS

| | | |
|---|---|---|
| 2012/0206391 A1 | 8/2012 | Kim et al. |
| 2012/0208466 A1 | 8/2012 | Park et al. |
| 2012/0208514 A1 | 8/2012 | Park et al. |
| 2012/0209878 A1 | 8/2012 | Park et al. |
| 2012/0210275 A1 | 8/2012 | Park et al. |
| 2012/0218191 A1 | 8/2012 | Huang et al. |
| 2012/0220224 A1 | 8/2012 | Walker |
| 2012/0254292 A1 | 10/2012 | Newton et al. |
| 2012/0254929 A1 | 10/2012 | Oztaskent et al. |
| 2012/0254931 A1 | 10/2012 | Oztaskent et al. |
| 2012/0270502 A1 | 10/2012 | Kazawa |
| 2012/0272158 A1 | 10/2012 | Weskamp et al. |
| 2012/0291072 A1 | 11/2012 | Maddison et al. |
| 2012/0297412 A1 | 11/2012 | Dasher et al. |
| 2012/0314914 A1 | 12/2012 | Karakotsios et al. |
| 2012/0320278 A1 | 12/2012 | Yoshitani et al. |
| 2013/0003822 A1 | 1/2013 | Margulis |
| 2013/0042292 A1 | 2/2013 | Buff et al. |
| 2013/0052997 A1 | 2/2013 | Killick et al. |
| 2013/0054697 A1 | 2/2013 | Cha |
| 2013/0055323 A1 | 2/2013 | Venkitaraman et al. |
| 2013/0058593 A1 | 3/2013 | Kanalakis et al. |
| 2013/0059547 A1 | 3/2013 | Kim et al. |
| 2013/0065526 A1 | 3/2013 | Pottier et al. |
| 2013/0091208 A1 | 4/2013 | Rajakarunanayake et al. |
| 2013/0091209 A1 | 4/2013 | Bennett et al. |
| 2013/0091212 A1 | 4/2013 | Rajakarunanayake |
| 2013/0109371 A1 | 5/2013 | Brogan et al. |
| 2013/0110900 A1 | 5/2013 | Jardins et al. |
| 2013/0111347 A1 | 5/2013 | Reilly et al. |
| 2013/0117698 A1 | 5/2013 | Park et al. |
| 2013/0138265 A1 | 5/2013 | Kim et al. |
| 2013/0138728 A1 | 5/2013 | Kim et al. |
| 2013/0205022 A1 | 8/2013 | Kagan et al. |
| 2013/0205319 A1 | 8/2013 | Sinha et al. |
| 2013/0210353 A1 | 8/2013 | Ling et al. |
| 2013/0229577 A1 | 9/2013 | McRae |
| 2013/0237156 A1 | 9/2013 | Jung et al. |
| 2013/0238538 A1 | 9/2013 | Cook et al. |
| 2013/0238702 A1 | 9/2013 | Sheth et al. |
| 2013/0249791 A1 | 9/2013 | Pryor |
| 2013/0265221 A1 | 10/2013 | Lee et al. |
| 2013/0265232 A1 | 10/2013 | Yun et al. |
| 2013/0265257 A1 | 10/2013 | Jung et al. |
| 2013/0265260 A1 | 10/2013 | Seo et al. |
| 2013/0265262 A1 | 10/2013 | Jung et al. |
| 2013/0268401 A1 | 10/2013 | Choi et al. |
| 2013/0298179 A1 | 11/2013 | Baum et al. |
| 2013/0309971 A1 | 11/2013 | Kiukkonen et al. |
| 2013/0310064 A1 | 11/2013 | Brachet et al. |
| 2013/0312018 A1 | 11/2013 | Elliott et al. |
| 2013/0317905 A1 | 11/2013 | Warner et al. |
| 2013/0321268 A1 | 12/2013 | Tuck et al. |
| 2013/0325396 A1 | 12/2013 | Yuen et al. |
| 2013/0325954 A1 | 12/2013 | Cupala et al. |
| 2013/0326552 A1 | 12/2013 | Adams |
| 2013/0332957 A1 | 12/2013 | DeWeese et al. |
| 2013/0338804 A1 | 12/2013 | Sheen |
| 2013/0339996 A1 | 12/2013 | Davis et al. |
| 2013/0342454 A1 | 12/2013 | Choi et al. |
| 2013/0342455 A1 | 12/2013 | Choi et al. |
| 2013/0347018 A1 | 12/2013 | Limp et al. |
| 2014/0004934 A1 | 1/2014 | Peterson et al. |
| 2014/0009476 A1 | 1/2014 | Venkitaraman et al. |
| 2014/0011448 A1 | 1/2014 | Yang |
| 2014/0015743 A1 | 1/2014 | Seo et al. |
| 2014/0019005 A1 | 1/2014 | Lee et al. |
| 2014/0026193 A1 | 1/2014 | Saxman et al. |
| 2014/0028596 A1 | 1/2014 | Seo et al. |
| 2014/0032635 A1 | 1/2014 | Pimmel et al. |
| 2014/0047392 A1 | 2/2014 | Kim et al. |
| 2014/0049463 A1 | 2/2014 | Seo et al. |
| 2014/0049464 A1 | 2/2014 | Kwak et al. |
| 2014/0049593 A1 | 2/2014 | Pai et al. |
| 2014/0055344 A1 | 2/2014 | Seo et al. |
| 2014/0055429 A1 | 2/2014 | Kwon et al. |
| 2014/0055681 A1 | 2/2014 | Murugesan |
| 2014/0059419 A1 | 2/2014 | Devries |
| 2014/0068719 A1 | 3/2014 | Kiukkonen et al. |
| 2014/0087752 A1 | 3/2014 | Zhu et al. |
| 2014/0214924 A1 | 7/2014 | Cha et al. |
| 2014/0331264 A1 | 11/2014 | Schneiderman et al. |
| 2014/0358685 A1 | 12/2014 | Want et al. |
| 2014/0362728 A1 | 12/2014 | Krochmal et al. |
| 2015/0120457 A1 | 4/2015 | Miller et al. |
| 2015/0154134 A1 | 6/2015 | Beaumont et al. |

FOREIGN PATENT DOCUMENTS

| | | |
|---|---|---|
| JP | 2013223085 | 4/2012 |
| JP | 2013055380 A | 3/2013 |
| KR | 1020130051924 | 6/2013 |
| KR | 1020130059124 A | 6/2013 |
| WO | 2012046276 A1 | 4/2012 |

OTHER PUBLICATIONS

Brant Candelore, "Proximity Detection of Candidate Companion Display Device in Same Room as Primary Display Using Infared Signaling", related U.S. Appl. No. 14/262,051, Applicant's response to Final Office Action filed Oct. 19, 2015.

Brant Candelore, "Proximity Detection of Candidate Companion Display Device in Same Room as Primary Display Using Camera", related U.S. Appl. No. 14/264,435, Non-Final Office Action dated Nov. 6, 2015.

Brant Candelore, "Proximity Detection of Candidate Companion Display Device in Same Room as Primary Display Using Camera", related U.S. Appl. No. 14/264,435, Applicant's response to Non-Final Office Action dated Nov. 10, 2015.

Brant Candelore, "Proximity Detection of Candidate Companion Display Device in Same Room as Primary Display Using Low Energy Bluetooth", related U.S. Appl. No. 14/281,158, Non-Final Office Action dated Dec. 7, 2015.

Brant Candelore, "Proximity Detection of Candidate Companion Display Device in Same Room as Primary Display Using Low Energy Bluetooth", related U.S. Appl. No. 14/281,158, Applicant's response to Non-Final Office dated Dec. 10, 2015.

Brant Candelore, "Proximity Detection of Candidate Companion Display Device in Same Room as Primary Display Using UPNP", related U.S. Appl. No. 14/262,051, Non-Final Office Action dated Dec. 17, 2015.

Brant Candelore, "Proximity Detection of Candidate Companion Display Device in Same Room as Primary Display Using UPNP", related U.S. Appl. No. 14/262,051, Applicant's response to Non-Final Office Action filed Dec. 22. 2015.

Brant Candelore, "Proximity Detection of Candidate Companion Display Device in Same Room as Primary Display Using Camera", related U.S. Appl. No. 14/264,435, Final Office Action dated Feb. 2, 2016.

Brant Candelore, "Proximity Detection of Candidate Companion Display Device in Same Room as Primary Display Using Camera", related U.S. Appl. No. 14/281,158, Final Office Action dated Feb. 17, 2016.

Brant Candelore, "Proximity Detection of Candidate Companion Display Device in Same Room as Primary Display Using Low Energy Bluetooth", related U.S. Appl. No. 14/281,158, Applicant's response to Final Office Action filed Feb. 18, 2016.

Brant Candelore: "Proximity Detection of Candidate Companion Display Device in Same Room as Primary Display Using Camera", related U.S. Appl. No. 14/264,435, Applicant's response to Final Office Action filed Feb. 12, 2016.

Brant Candelore, "Proximity Detection of Candidate Companion Display Device in Same Room as Primary Display Using Sonic Signaling", related U.S. Appl. No. 14/278,383, Non-Final Office Action dated Feb. 19, 2016.

Brant Candelore, "Proximity Detection of Candidate Companion Display Device in Same Room as Primary Display Using Sonic Signaling", related pending U.S. Appl. No. 14/278,383 final office action dated May 3, 2016.

(56) References Cited

OTHER PUBLICATIONS

Brant Candelore, "Proximity Detection of Candidate Companion Display Device in Same Room as Primary Display Using Sonic Signaling", related U.S. Appl. No. 14/278,383, Applicant's response to Non-Final Office Action filed Apr. 4, 2016.
Brant Candelore, "Proximity Detection of Candidate Companion Display Device in Same Room as Primary Display Using UPNP", related U.S. Appl. No. 14/262,051, Final Office Action dated Mar. 3, 2016.
Brant Candelore, "Proximity Detection of Candidate Companion Display Device in Same Room as Primary Display Using UPNP", related U.S. Appl. No. 14/262,051, Applicant's response to Final Office Action filed Apr. 4, 2016.
Brant L. Candelore, "Proximity Detection of Candidate Companion Display Device in Same Room as Primary Display Using Lower Energy Bluetooth", related pending U.S. Appl. No. 14/281,158, non-final office action fied May 10, 2016.
Brant L. Candelore, "Proximity Detection of Candidate Companion Display Device in Same Room as Primary Display Using Lower Energy Bluetooth", related pending U.S. Appl. No. 14/281,158, applicants response to non-final office action filed May 12, 2016.
Brant L. Candelore, "Proximity Detection of Candidate Companion Display Device in Same Room as Primary Display Using Sonic Signaling", related pending U.S. Appl. No. 14/278,383, applicants response to final office action filed May 12, 2016.
Brant Candleore, "Proxmity Detection of Candidate Companion Display Device in Same Room as Primary Display Using UPNP", related pending U.S. Appl. No. 14/262,051, non-final office action dated May 12, 2016.
Brant Candelore, "Proximity Detection of Candidate Companion Display Device in Same Room as Primary Display Using Low Energy Bluetooth", related U.S. Appl. No. 14/281,158, Final Office Action dated Jun. 3, 2016.
Brant Candelore, "Proximity Detection of Candidate Companion Display Device in Same Room as Primary Display Using Camera", related U.S. Appl. No. 14/264,435, Non-Final Office Action dated Jun. 22, 2016.
Brant Candelore, "Proximity Detection of Candidate Companion Display Device in Same Room as Primary Display Using Camera", related U.S. Appl. No. 14/264,435, Applicant's response to Non-Final Office Action filed Jun. 23, 2016.
Sriram Sampathkumaran, "Recognizing and Registering Faces in Video", related U.S. Appl. No. 14/244,155, Non-Final Office Action dated Jul. 12, 2016.
Brant Candelore, "Proximity Detection of Candidate Companion Display Device in Same Room as Primary Display Using Sonic Signaling", related U.S. Appl. No. 14/278,383, Non-Final Office Action dated Jul. 18, 2016.
Brant Candelore, "Proximity Detection of Candidate Companion Display Device in Same Room as Primary Display Using Sonic Signaling", related U.S. Appl. No. 14/278,383, Applicant's response to Non-Final Office fiction filed Jul. 18, 2016.
Brant Candelore, "Proximity Detection of Candidate Companion Display Device in Same Room as Primary Display Using Low Energy Bluetooth", related U.S. Appl. No. 14/281,158, Applicant's response to Final office Action filed Jul. 21, 2016.
Sriram Sampathkumaran, "Recognizing and Registering Faces in Video", related U.S. Appl. No. 14/244,155, Applicant's response to Non-Final Office Action filed Jul. 21, 2016.
Brant Candelore, "Proximity Detection of Candidate Companion Display Device in Same Room as Primary Display Using UPNP", related U.S. Appl. No. 14/262,051, Applicant's response to Non-Final Office Action filed Jul. 20, 2016.
Brant Candelore, "Proximity Detection of Candidate Companion Display Device in Same Room As Primary Display Using UPNP", related U.S. Appl. No. 14/262,051, Non-Final Office Action dated Mar. 12, 2015.
Brant Candelore, "Proximity Detection of Candidate Companion Display Device in Same Room As Primary Display Using UPNP", related U.S. Appl. No. 14/262,051, Applicant's response to Non-Final Office Action dated Mar. 12, 2015.
UPnP Forum—UPnP Device Architecture 1.0, Oct. 15, 2008.
Brant Candelore, "Proximity Detection of Candidate Companion Display Device in Same Room as Primary Display Using UPNP", related U.S. Appl. No. 14/262,051, Final Office Action dated Jun. 5, 2015.
Brant Candelore, "Proximity Detection of Candidate Companion Display Device in Same Room as Primary Display Using UPNP", related U.S. Appl. No. 14/262,051, Applicant's response to Final Office Action filed Jun. 8, 2015.
Brant Candelore, "Proximity Detection of Candidate Companion Display Device in Same Room as Primary Display Using Low Energy Bluetooth", file history of related pending U.S. Appl. No. 14/281,158, filed May 19, 2014.
Brant Candelore, "Proximity Detection of Candidate Companion Display Device in Same Room as Primary Display Using Camera", file history of related pending U.S. Appl. No. 14/264,435, filed Apr. 29, 2014.
Brant Candelore, "Proximity Detection of Candidate Companion Display Device in Same Room as Primary Display Using Sonic Signaling", file history of related pending U.S. Appl. No. 14/278,383, filed May 15, 2014.
Sriram Sampathkumaran, "Recognized and Registering Faces in Video", file history of related pending U.S. Appl. No. 14/244,155, filed Apr. 3, 2014.
Brant Candelore, "Proximity Detection of Candidate Companion Display Device in Same Room as Primary Display Using UPNP", file history of related pending U.S. Appl. No. 14/262,051, filed Apr. 25, 2014.
Brant Candelore, "Proximity Detection of Candidate Companion Display Device in Same Room as Primary Display Using UPNP", related U.S. Appl. No. 14/262,051, Non-Final Office Action dated Jul. 17, 2015.
Brant Candelore, "Proximity Detection of Candidate Companion Display Device in Same Room as Primary Display Using UPNP", related U.S. Appl. No. 14/262,051, Applicant's response to Non-Final Office Action filed Jul. 21, 2015.

* cited by examiner

PROXIMITY DETECTION OF CANDIDATE COMPANION DISPLAY DEVICE IN SAME ROOM AS PRIMARY DISPLAY USING INFRARED SIGNALING

FIELD OF THE INVENTION

The application relates generally to determining that a candidate companion display device is in the same room as a primary display using infrared signaling.

BACKGROUND OF THE INVENTION

A computer ecosystem, or digital ecosystem, is an adaptive and distributed socio-technical system that is characterized by its sustainability, self-organization, and scalability. Inspired by environmental ecosystems, which consist of biotic and abiotic components that interact through nutrient cycles and energy flows, complete computer ecosystems consist of hardware, software, and services that in some cases may be provided by one company, such as Sony. The goal of each computer ecosystem is to provide consumers with everything that may be desired, at least in part services and/or software that may be exchanged via the Internet. Moreover, interconnectedness and sharing among elements of an ecosystem, such as applications within a computing cloud, provides consumers with increased capability to organize and access data and presents itself as the future characteristic of efficient integrative ecosystems.

Two general types of computer ecosystems exist: vertical and horizontal computer ecosystems. In the vertical approach, virtually all aspects of the ecosystem are owned and controlled by one company, and are specifically designed to seamlessly interact with one another. Horizontal ecosystems, one the other hand, integrate aspects such as hardware and software that are created by other entities into one unified ecosystem. The horizontal approach allows for greater variety of input from consumers and manufactures, increasing the capacity for novel innovations and adaptations to changing demands.

An example ecosystem that is pertinent here is a home entertainment ecosystem that includes a TV and various nearby display devices such as wireless communication devices.

SUMMARY OF THE INVENTION

As understood herein, to pair the TV with a device in the home ecosystem for use as a "companion" device to the TV, typically a user must select a device from a long list of ecosystem devices, in the home and in many cases those in neighboring homes, which might have been discovered wirelessly. Usually, it is up to the user (a human) to figure out which devices are in the home let alone the same room.

Present principles are directed to allowing a primary display device (PDD) such as an audio video display device (AVDD) such as a TV to discover candidate companion screen devices (CCSD), e.g., tablet computers, wireless telephones, and the like that are not just present in the home ecosystem but that also are in the same room as the PDD. This promotes intelligently selecting which one of multiple CCSDs to select for presenting ancillary content related to primary content being shown on the PDD, as CCSDs outside the room in which the PDD is located are not as useful or even desirable to show ancillary content when the user of the outside-the-room device cannot see the PDD. The PDD can send a CCSD in the same room as the PDD a message about whether the user desires to have ancillary data presented on the CCSD.

It should be noted that the PDD may be established by a device with a relatively small display such as a wireless tablet, if it is the device of focus with content that is playing. In this scenario, the CCSD may be established by, for example, a larger screen TV without affecting present principles.

Accordingly, a device includes at least one computer readable storage medium bearing instructions executable by a processor, and at least one processor configured for accessing the computer readable storage medium to execute the instructions to configure the processor for determining whether a candidate companion screen device (CCSD) is within a room in a building in which a primary display device (PDD) is disposed. The PDD is configured for presenting primary content. Responsive to determining that the CCSD is within the room in the building in which the PDD is disposed, the processor when executing the instructions is configured for causing ancillary content related to the primary content to be provided to the CCSD for presentation of the ancillary content thereon, and/or causing a message regarding accessing ancillary content to be provided to the CCSD for presentation of the message thereon. The processor when executing the instructions is configured for determining whether a CCSD is within a room in a building in which the PDD is disposed at least in part by infrared (IR) signaling.

The device can be implemented by the PDD, or by the CCSD, or by a combination thereof.

In specific examples, the processor when executing the instructions is configured for sending a wireless message instructing a CCSD to respond with a response message. In some examples, the wireless message is sent using Bluetooth and the response message is sent using IR. In other examples, the wireless message is sent using Wi-Fi and the response message is sent using IR. In other examples, the wireless message is sent using IR and the response message is sent using Bluetooth. In other examples, the wireless message is sent using IR and the response message is sent using Wi-Fi. In other examples, the wireless message is sent using IR and the response message is sent using IR.

In another aspect, a device includes at least one computer readable storage medium bearing instructions executable by a processor and at least one processor configured for accessing the computer readable storage medium to execute the instructions to configure the processor for determining whether a candidate companion screen device (CCSD) responds to a wireless message from a primary display device (PDD). The PDD is configured for presenting primary content. Responsive to determining that the CCSD responds to the wireless message, the processor when executing the instructions is configured for causing ancillary content related to the primary content to be provided to the CCSD for presentation of the ancillary content thereon, and/or causing a message regarding accessing ancillary content to be provided to the CCSD for presentation of the message thereon. The processor when executing the instructions is configured for determining whether a CCSD responds to the wireless message at least in part by sending the wireless message using infrared (IR) signaling and/or by receiving a response from the CCSD to the wireless message over IR.

In another aspect, a device includes at least one computer readable storage medium bearing instructions executable by a processor and at least one processor configured for accessing the computer readable storage medium to execute the instructions to configure the processor for receiving, at a candidate companion screen device (CCSD), a wireless message from a primary display device (PDD). The PDD is configured for presenting primary content. Responsive to receiving the wireless message, the processor when executing the instructions is configured sending a response message to the PDD which if received by the PDD causes ancillary content related to the primary content to be provided to the CCSD for presentation of the ancillary content thereon, and/or causes a message regarding accessing ancillary content to be provided to the CCSD for presentation of the message thereon. The wireless message is infrared (IR) and/or the response message is IR.

The details of the present invention, both as to its structure and operation, can be best understood in reference to the accompanying drawings, in which like reference numerals refer to like parts, and in which:

DETAILED DESCRIPTION OF THE PREFERRED EMBODIMENT

Figure 1:
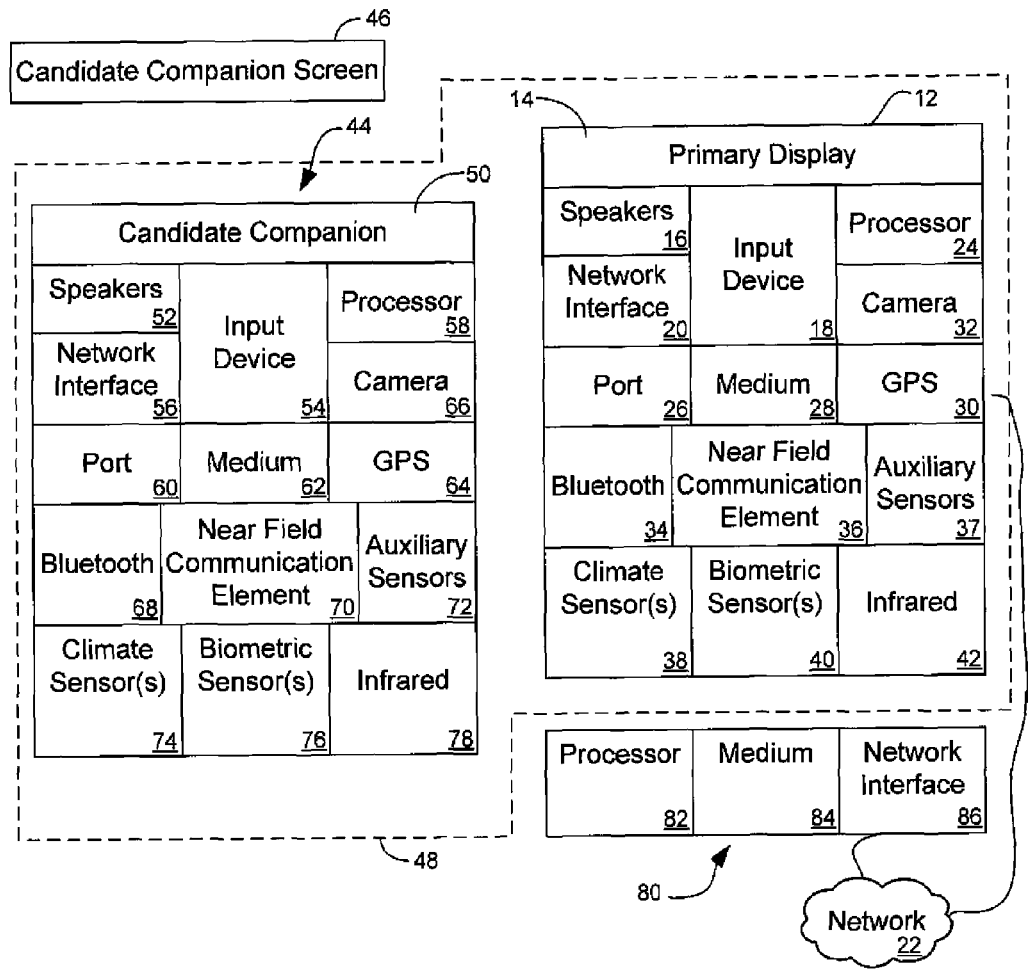
FIG. 1 is a block diagram of an example system including an example in accordance with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition flat screen and that may be touch-enabled for receiving user input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a user through the headphones. The AVDD 12 may further include one or more tangible computer readable storage medium 28 such as disk-based or solid state storage. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types that may establish candidate companion screen devices for the primary display device established by the AVDD 12. In one example, a first candidate companion screen device is established by a first CE device 44 while a second companion screen device may be established by a second CE device 46 which may include similar components as the first CE device 44 and hence will not be discussed in detail. In the example shown, only two CE devices 44, 46 are shown as candidate companion screen devices, it being understood that only one candidate companion screen device or more than two candidate companion screen devices may be used.

In the example shown, to illustrate present principles all three devices 12, 44, 46 are assumed to be members of a home entertainment network in a dwelling or at least to be present in proximity to each other in a location such as a house. However, for illustrating present principles the first CE device 44 is assumed to be in the same room as the AVDD 12, bounded by walls illustrated by dashed lines 48, whereas the second CE device 46, while not being necessarily further from the AVDD 12 as is the first CE device 44 and in fact while potentially being closer to the AVDD 12 than is the first CE device 44, is outside the room bounded by the walls 48.

The example non-limiting first CE device 44 may be established by any one of the above-mentioned devices and accordingly may have one or more of the components described below. Specifically, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 42 such as an IR data association (IRDA) device. A battery (not shown) may be provided for powering the first CE device 44. The second CE device 46 may include some or all of the components shown for the CE device 44.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments.

Figure 2:
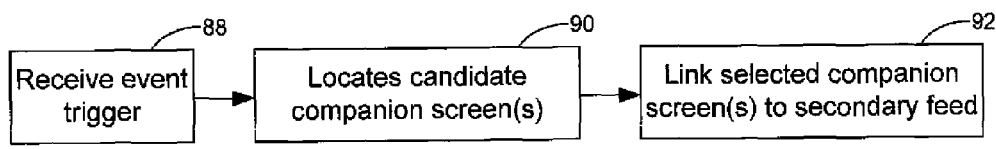
FIGS. 2-4 are flow charts showing example algorithms according to present principles.

FIG. 2 shows overall logic according to present principles. In some examples an event trigger may be received at block 88 to activate the ensuing logic. For example, a particular actor or product or sound may appear or program change in a broadcast channel being presented on the AVDD 12 as indicated by metadata in the program, or by recognition of demanded images by the AVDD processor 24, or by recognition of sounds presented on the AVDD 12 speakers 16 as detected by the microphone 18 and analyzed by the processor 24 either in a standalone mode and/or by uploading the images/sounds to the cloud server 80 for analysis, which sends the analysis results back to the AVDD 12. Or, using detection principles below the AVDD 12 may recognize that a candidate companion device 44 or 46 has been carried into the room in which the AVDD 12 is disposed, using such recognition as a trigger.

In any case, as set forth further below at block 90 the AVDD 12 locates candidate companion screens that are in the same room as the AVDD 12, screening out candidate companion screens that may be nearby but outside the walls 48. At block 92 one or more candidate companion screens that are detected as being in the same room as the AVDD 12 are provided with ancillary feed(s) related to the program being presented on the AVDD 12 by, e.g., linking the companion screen(s) to a computer site associated with the program being presented on the AVDD 12. This linking may entail simply providing a network address or link from the AVDD 12 to the companion screen which a user can select to cause a network browser to access a computer network site on the home network, on the PDD itself, or on the Internet supplying the ancillary feed/content/data (used interchangeably), or the linking may be more automated, e.g., the AVDD may command the companion screen device to automatically access a particular network site and automatically commence downloading the ancillary feed/content/data without any user action to accomplish this.

Figure 3:
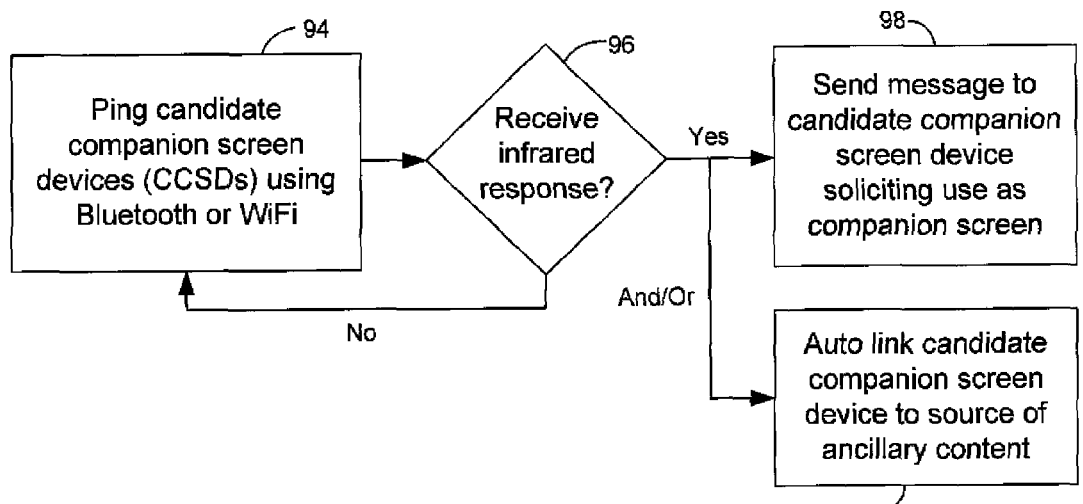

FIG. 3 illustrates example logic. Commencing at block 94, the PDD may send a ping, essentially a wireless message, to candidate companion screen devices (CCSDs) one at a time using Bluetooth, Wi-Fi, or a combination thereof. The wireless message is addressed to the network address of each CCSD as discovered by, e.g., Bluetooth discovery principles, UP-n-Up, Bonjour, or as manually input to the PDD by a user, or by other means. The wireless message contains a value instructing a receiving CCSD to respond using IR, e.g., using IRDA. The value may instruct a receiving CCSD to respond to the code with a specific response code over IR to reduce ambiguity.

Proceeding to decision diamond 96, it is determined whether the PDD receives a response via IR to the wireless message from one or more CCSDs, including, when requested, a correct response code. It may now be appreciated that since IR cannot pierce walls, the PDD receiving a correct response over IR may infer that the response originator is in the same room as the PDD and thus determine for present purposes that the CCSD may be a good candidate for presenting ancillary data.

Responsive to a positive test at decision diamond 96, the logic can move to block 98. If only one CCSD causes a positive test at decision diamond 96, at block 98 a message may be sent (e.g., from the PDD through the Bluetooth transmitter 34, or through the NFC element 36, or through network interface 20, or through the IR element 42) to the CCSD (using, for example, the appropriate network address thereof) soliciting use of the CCSD as a companion screen to the PDD. An example of such a message is shown further below. The logic of block 92 in FIG. 2 may then be employed if the user of the solicited CCSD accepts the solicitation.

If multiple CCSDs trigger positive responses to decision diamond 96, the logic of block 98 may be executed for each such CCSD to send the message to each such CCSD. Or, the logic of block 98 may be executed only for one of the CCSDs transmitting the reply signal with the strongest signal strength. Or, the logic of block 98 may be executed only for the one of the CCSDs with a positive test at decision diamond 96 that is of a particular model of CE device. In this instance, for example, if both a tablet computer and a mobile telephone trigger positive tests at decision diamond 96, only the tablet computer may be sent the message at block 98, on the ground that the tablet computer likely will have a larger display than the telephone.

In addition to the logic of block 98 or alternatively to it, at block 100, for at least one CCSD triggering a positive test at decision diamond 96, the CCSD may be caused (as by command from the PDD) to automatically access a particular network site (as identified, e.g., by the PDD from metadata accompanying the primary content) and to automatically commence downloading the ancillary feed/content/data without any user action to accomplish this.

Figure 4:
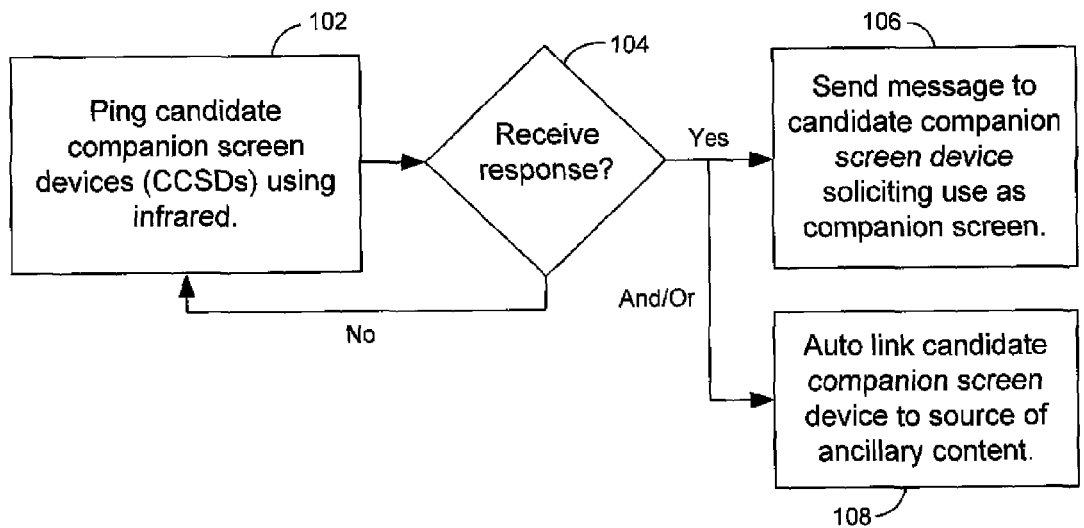

FIG. 4 illustrates additional example logic. Commencing at block 102, the PDD may send a ping, essentially a wireless message, to CCSDs using IR. The wireless message is addressed to the network address of each CCSD as discovered by, e.g., any one of the methods described above. The wireless message contains a value instructing a receiving CCSD to respond using IR, e.g., using IRDA, or to respond using Bluetooth or Wi-Fi. The value may instruct a receiving CCSD to respond to the code with a specific response code to reduce ambiguity.

Proceeding to decision diamond 104, it is determined whether the PDD receives a correct response to the wireless message from one or more CCSDs over the protocol requested, including, when requested, a correct response code. It may now be appreciated that since IR cannot pierce walls, the PDD receiving a correct response to its IR message requesting a response, no matter which protocol that response is sent over, may infer that the response originator is in the same room as the PDD and thus determine for present purposes that the CCSD may be a good candidate for presenting ancillary data.

Responsive to a positive test at decision diamond 104, the logic can move to block 106. If only one CCSD causes a positive test at decision diamond 104, at block 106 a message may be sent (e.g., from the PDD through the Bluetooth transmitter 34, or through the NFC element 36, or through network interface 20, or through the IR element 42) to the CCSD (using, for example, the appropriate network address thereof) soliciting use of the CCSD as a companion screen to the PDD. An example of such a message is shown further below. The logic of block 92 in FIG. 2 may then be employed if the user of the solicited CCSD accepts the solicitation.

If multiple CCSDs trigger positive responses to decision diamond 104, the logic of block 106 may be executed for each such CCSD to send the message to each such CCSD. Or, the logic of block 106 may be executed only for one of the CCSDs transmitting the reply signal with the strongest signal strength. Or, the logic of block 106 may be executed only for the one of the CCSDs with a positive test at decision diamond 104 that is of a particular model of CE device. In this instance, for example, if both a tablet computer and a mobile telephone trigger positive tests at decision diamond 104, only the tablet computer may be sent the message at block 106, on the ground that the tablet computer likely will have a larger display than the telephone.

In addition to the logic of block 106 or alternatively to it, at block 108, for at least one CCSD triggering a positive test at decision diamond 104, the CCSD may be caused (as by command from the PDD) to automatically access a particular network site (as identified, e.g., by the PDD from metadata accompanying the primary content) and to automatically commence downloading the ancillary feed/content/data without any user action to accomplish this.

Note that the logic of states 94, 96, 102, 104 may alternately be accomplished by the CCSD, in which case in the event of a positive test at state 96 (or 104 as the case may be) the CCSD can send a message over an appropriate link to the PDD to the effect that the CCSD is in the same room as the PDD and thus is poised to receive and/or present ancillary content.

Figure 5:
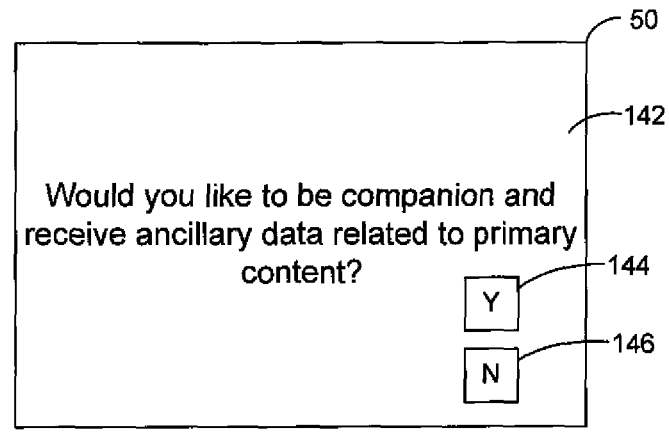
FIGS. 5-7 are example screen shots of a companion screen device according to present principles.

FIG. 5 shows an example UI presenting an example solicitation message 142 on a display 50 of a CCSD pursuant to any one of the "message solicitation" blocks described above. A user may select a "yes" selector element 144 to accept the CCSD to be a companion screen to the PDD, in which case the PDD may send a link to the CCSD to a computer site or broadcast site or other site to download ancillary content or provide the ancillary content itself from data that it is receiving but not displaying on the primary display 14. Or, in response to selecting the selector 144 the PDD may automatically cause the CCSD to automatically and without user interaction begin downloading the ancillary content as described above. The user can decline to have the CCSD used as a companion device by selecting a "no" selector element 146.

Figure 6:
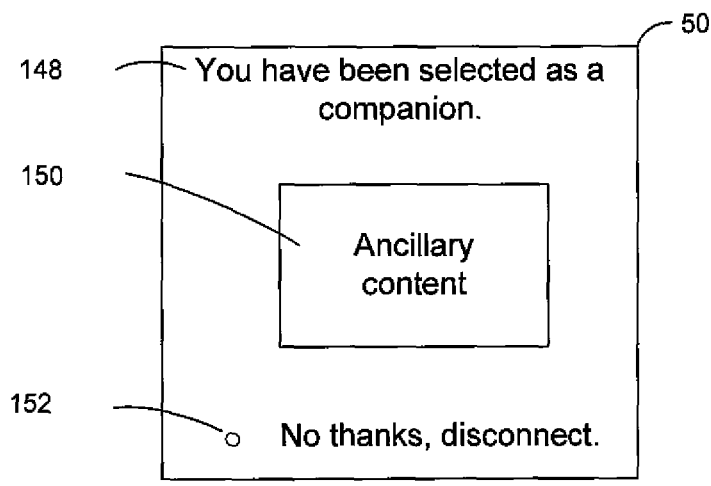

FIG. 6 illustrates a UI that can be presented on a display 50 of a CCSD pursuant to any one of "automatic linking" blocks described above. As shown, a message 148 may inform the user of the CCSD that the CCSD has been selected as a companion device, and a window 150 of the display 50 is used to present the ancillary content, which recall is effected automatically without user interaction once the CCSD signal strength has satisfied the threshold test. A decline selector 152 may be presented which when selected disconnects or otherwise disables, at least temporarily, the CCSD from use as a companion screen to the PDD.

Figure 7:
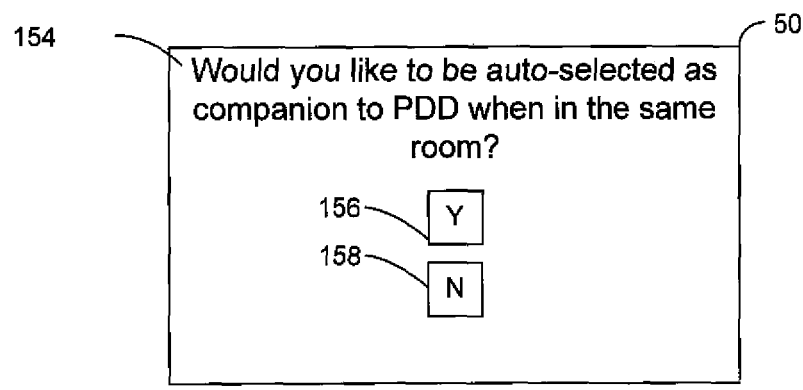

FIG. 7 illustrates an example UI that can be presented on a display 50 of a CCSD in a set-up mode to essentially allow the user to select between the two modes embodied in FIGS. 5 and 6. A message 154 may be presented asking the user if the user would like the CCSD to be subject to automatic selection as a companion screen to the PDD when the CCSD is in the same room as the PDD. A yes selector 156 enables a user to select this feature, while a no selector 158 enables a user to decline automatic selection of the CCSD as a companion screen.

While the particular PROXIMITY DETECTION OF CANDIDATE COMPANION DISPLAY DEVICE IN SAME ROOM AS PRIMARY DISPLAY USING INFRARED SIGNALING is herein shown and described in detail, it is to be understood that the subject matter which is encompassed by the present invention is limited only by the claims.

What is claimed is:
1. A device comprising:
at least one computer memory that is not a transitory signal and that comprises instructions executable by a processor for:
transmitting, from a primary display device (PDD), a wireless message containing a value instructing a receiving candidate companion screen device (CCSD) to respond to the message using infrared (IR) transmission, the value instructing a receiving CCSD to respond to the message with a specific response code over IR;

determining whether a CCSD responds to the message with an IR response message conforming to the specific response code, the PDD being configured for presenting primary content; and responsive to determining that the CCSD responds to the message with an IR response message conforming to the specific response code, causing ancillary content related to but different from the primary content to be provided to the CCSD for presentation of the ancillary content thereon, and/or causing a message regarding accessing ancillary content different from the primary content to be provided to the CCSD for presentation of the message thereon.

2. The device of claim 1, wherein the device is implemented by the PDD.

3. The device of claim 1, wherein the wireless message is sent using Bluetooth and the response message is sent using IR.

4. The device of claim 1, wherein the wireless message is sent using Wi-Fi and the response message is sent using IR.

5. The device of claim 1, wherein the wireless message is sent using IR and the response message is sent using IR.

6. A device comprising:

at least one computer readable storage medium comprising instructions executable by a processor for undertaking logical steps;

at least one processor configured for accessing the computer readable storage medium to execute the instructions to configure the processor for undertaking the logical steps, the logical steps embodied by the instructions and undertaken by the processor comprising:

transmitting, from a primary display device (PDD), a wireless message containing a value instructing a receiving candidate companion screen device (CCSD) to respond to the message using infrared (IR) transmission, the message instructing a receiving CCSD to respond to the message with a specific response code over IR;

determining whether a CCSD responds to the wireless message with an IR response message conforming to the specific response code, the PDD being configured for presenting primary content; and responsive to determining that the CCSD responds to the wireless message with an IR response message conforming to the specific response code, causing ancillary content related to the primary content and different therefrom to be provided to the CCSD for presentation of the ancillary content thereon, and/or causing a message regarding accessing ancillary content to be provided to the CCSD for presentation of the message thereon.

7. The device of claim 6, wherein the device is implemented by the PDD.

8. The device of claim 6, wherein the wireless message is sent using Bluetooth or Wi-Fi and the response message is sent using IR.

9. The device of claim 6, wherein the wireless message is sent using IR and the response message is sent using IR.

10. A method comprising:

receiving at a candidate companion screen device (CCSD) a wireless message from a primary display device (PDD), the PDD being configured for presenting primary content, the wireless message containing a value instructing the CCSD to respond to the wireless message using infrared (IR) transmission, the message instructing a receiving CCSD to respond to the message with a specific response code over IR; and responsive to receiving the wireless message, sending an IR response message to the PDD which if received by the PDD causes ancillary content related to the primary content and different therefrom to be provided to the CCSD for presentation of the ancillary content thereon, and/or causes a message regarding accessing ancillary content to be provided to the CCSD for presentation of the message thereon.

11. The method of claim 10, wherein the wireless message is sent using Bluetooth or Wi-Fi and the response message is sent using IR.

12. The method of claim 10, wherein the wireless message is sent using IR and the response message is sent using IR.

13. The device of claim 1, wherein the instructions are executable for:

responsive to determining that the CCSD responds to the message with an IR response message conforming to the specific response code, causing ancillary content related to but different from the primary content to be provided to the CCSD for presentation of the ancillary content thereon.

14. The device of claim 1, wherein the instructions are executable for:

responsive to determining that the CCSD responds to the message with an IR response message conforming to the specific response code, causing a message regarding accessing ancillary content different from the primary content to be provided to the CCSD for presentation of the message thereon.

15. The device of claim 1, comprising the processor.

16. The device of claim 6, wherein the logical steps comprise:

responsive to determining that the CCSD responds to the wireless message with an IR response message conforming to the specific response code, causing ancillary content related to the primary content and different therefrom to be provided to the CCSD for presentation of the ancillary content thereon.

17. The device of claim 6, wherein the logical steps comprise:

responsive to determining that the CCSD responds to the wireless message with an IR response message conforming to the specific response code, causing a message regarding accessing ancillary content to be provided to the CCSD for presentation of the message thereon.

18. The method of claim 10, comprising:

responsive to receiving the wireless message, sending an IR response message to the PDD which if received by the PDD causes ancillary content related to the primary content and different therefrom to be provided to the CCSD for presentation of the ancillary content thereon.

19. The method of claim 10, comprising:

responsive to receiving the wireless message, sending an IR response message to the PDD which if received by the PDD causes a message regarding accessing ancillary content to be provided to the CCSD for presentation of the message thereon.

20. The device of claim 6, wherein the wireless message is sent using Bluetooth and the response message is sent using IR.

21. The device of claim 6, wherein the wireless message is sent using Wi-Fi and the response message is sent using IR.

22. The method of claim 10, wherein the wireless message is sent using Bluetooth and the response message is sent using IR.

23. The method of claim 10, wherein the wireless message is sent using Wi-Fi and the response message is sent using IR.

* * * * *